Oct. 12, 1948.   H. F. FENLON   2,451,437
PIPE COUPLING
Filed Jan. 25, 1946
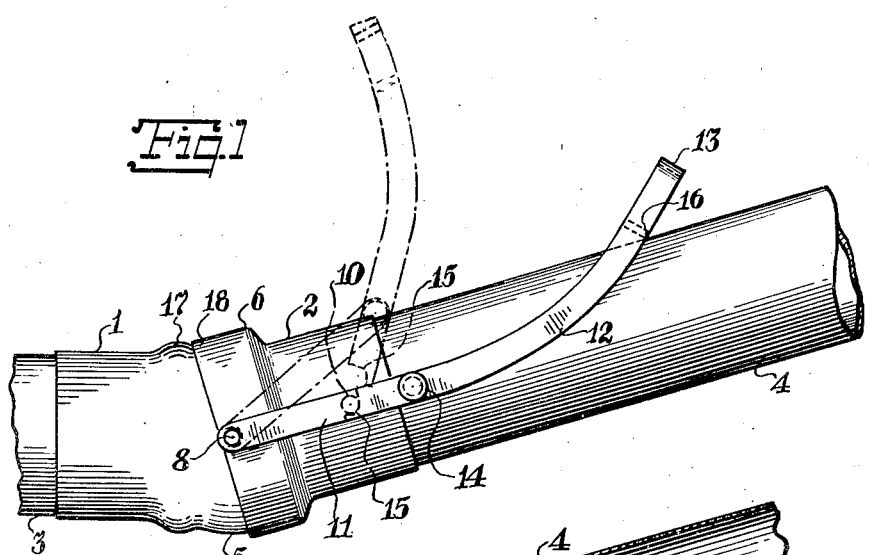
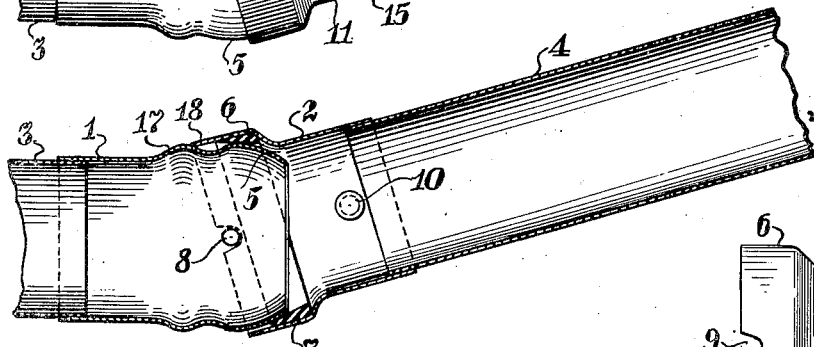
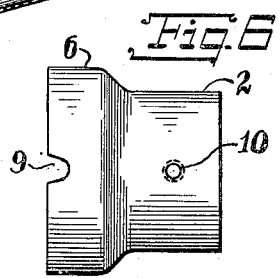
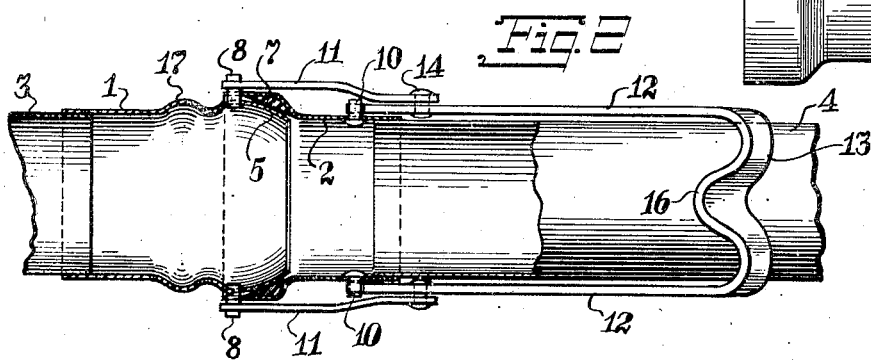
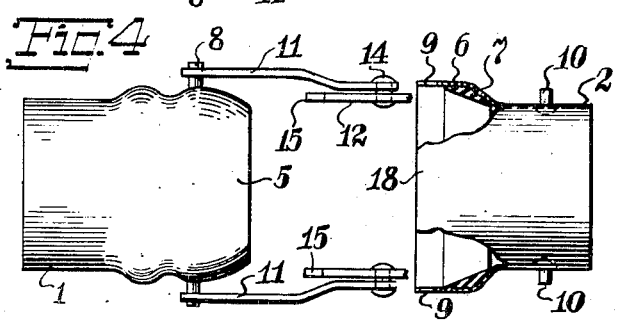
INVENTOR
Hugh F. Fenlon
BY
ATTORNEY Patented Oct. 12, 1948

2,451,437

UNITED STATES PATENT OFFICE 2,451,437

PIPE COUPLING

Hugh Francis Fenlon, Pelham, N. Y., assignor of one-half to John J. Dougherty, St. Albans, N. Y.

Application January 25, 1946, Serial No. 643,240

5 Claims. (Cl. 285—93)

My invention relates to flexible couplings intended primarily for fluid distribution systems of the portable or temporary type.

The main object is to provide a simple and inexpensive but effective coupling which can be readily effected in the field without the use of tools.

One object is to ensure a tight joint which can be assembled at various angles of pipe alignment.

Another object is to provide a joint which will withstand great pressure in the line.

Another object is to provide a coupling, the parts of which can be readily separated.

Another object is to provide a joint which will provide uniform pressure on the gasket at all angular connections.

Another object is to provide a coupling that cannot be joined at an angular alignment greater than that which will provide adequate sealing.

Another object is to provide a handle for dragging, pulling or carrying a length of pipe and for drawing together preparatory to fastening.

Fig. 1 is a side view of a coupling involving my invention, the parts of the joints being turned out of alignment. This shows the clamping devices in dotted lines in the position they occupy when ready to draw the pipe sections together, and in full lines at they appear when the pipe sections have been coupled together tightly.

Fig. 2 is a longitudinal view and partial section showing the sections coupled together.

Fig. 3 is a longitudinal sectional view showing the pipe sections of Fig. 1 without the clamping device.

Fig. 4 is a plan view of one of the pipe sections, with the clamping links attached.

Fig. 5 is a plan and partial section of the other pipe section.

Fig. 6 is a side view of the latter pipe section.

The parts of the joint involving the invention are the pipe sections 1 and 2 which may be formed of sheet metal, forgings or castings. These are part of or secured or connected, in any suitable manner, to pipe or hose sections 3 and 4 of any length.

Section 1 has a bulbous enlargement or head 5 of approximately spherical form which fits or extends into the enlarged collar 6 of section 2. A resilient gasket 7 of approximately wedge-like cross-section is located within the collar 6 and surrounds the head 5 when the parts are assembled.

Section 1 has two oppositely projecting bearing bolts, pins or studs 8, 8 integral with or suitably secured to it and located in the head 5.

Section 2 has corresponding notches 9, 9 adapted to receive the pins or studs 8, 8 when the parts are assembled. Section 2 has two studs, pins or bolts 10, 10 on opposite sides in longitudinal alignment with the notches 9, 9.

The clamping device has two links 11, 11 and a lever having side arms 12, 12 with a cross piece 13 constituting a handle. The links are hinged to the studs 8, 8 and to the bolts or pins 14, 14 carried by the lever arms 12, 12.

When the pipe sections are drawn together, the clamping lever is moved from the position shown dotted in Fig. 1 to the full line position during which movement the hook-like ends 15, 15 of the lever arms are inserted to engage the studs 10, 10. The notches 9, 9, in the section 2, are in alignment with the studs 10, 10 and serve to properly position the two sections when assembled. This ensures the proper positioning both of the hook-like ends 15, 15 of the clamping lever on the opposite sides of the pipe so as to properly align the pipe sections. The lever handle has a stop 16 which strikes the pipe section 4 to limit the closing movement of the lever. The studs 8 and 10 are in alignment when the pipe sections are clamped together. The clamping lever is designed to carry the hinge pins 14, 14 slightly past the line of center of studs 8, 8 and 10, 10 so as to produce a toggle action and thus lock the parts together.

In order to limit the angle of alignment of the pipe sections at a position which will assure sufficient bearing of the head 5 against the gasket 7, I provide shoulders 17, 17 which may be suitably formed as a part of or attached to the section 1 where they will serve as stops or abutments for the end 18 of the section collar 6.

One of the important features of the handle is that in its locked position the direction of pressure of the union is approximately along the axis of the pipes or only slightly off because of the travel just past dead center. This produces substantially equal pressure all around the gasket.

By this arrangement, it will be seen that the sections may be drawn tightly together and that the joint will be tight because of the fitting of the spherical head 5 against the gasket 7. It also permits considerable angular divergence of the sections which is quite important in laying a conduit along uneven ground. Fluid pressure within the conduit tends to force the gasket into tight engagement between the bulbous head and the surrounding collar. It is also easy to separate the pipe sections by simply lifting the handle so as to break the toggle connection whereupon the sections are free to separate.

I claim:

1. A pipe coupling comprising a section having oppositely projecting studs near its end, a second section having an enlarged end embracing the end of the other section and having open notches in its enlarged end to receive said studs and studs projecting from its opposite sides in line with said open notches, a pair of links hinged to said first-mentioned studs, a pair of lever arms hinged between their ends to said links and having means at one end of each adaptable to interlock with the studs on the second-mentioned section and means for limiting the movement of said lever arms when the hinges of said levers pass the center lines of the respective studs.

2. A pipe coupling comprising a section having oppositely projecting studs near its end, a second section having an enlarged end embracing the end of the other section and having open notches in the opposite sides of its enlarged end to receive said studs and studs projecting from its opposite sides in line with its open notches, a pair of links hinged to said first-mentioned studs, a pair of lever arms hinged between their ends to said links and having means at one end of each adaptable to engage the studs on the second-mentioned section and means for limiting the movement of said lever arms when the hinges of said lever pass the center lines of the respective studs and means for limiting the angular movement of one section with respect to the other about the axis of the first-mentioned studs.

3. A pipe coupling comprising a section having a spheroidal head to one end with oppositely projecting axial studs, a second section having an enlarged end embracing the spheroidal end of the other section and having open notches in its enlarged end to receive said studs and other studs projecting from its opposite sides in line with said open notches, a wedge-like gasket secured in the enlarged end, a pair of links hinged to said first-mentioned studs, a lever having a pair of lever arms hinged between their ends to said links and having means at one end of each adaptable to interlock with the studs on the second-mentioned section to draw the wedge-like gasket secured in the enlarged end of the outer section to form a seal against the spheroidal head of the inner section to ensure a substantially uniform pressure at various angles and means for limiting the angular movement of one section with respect to the other about an axis passing through the first-mentioned studs.

4. A pipe coupling comprising a section having a spheroidal head at one end with studs projecting axially from opposite sides of the spherical part of said section, a second section having an enlarged end containing a gasket embracing the spheroidal head of the other section and having open notches in its enlarged end to receive said studs whereby a substantial ball and socket connection may be made between the sections, said second section having studs projecting from its opposite sides in line with its open notches, a pair of links hinged to the first-mentioned studs, a lever having a pair of arms hinged between their ends to said links and having means at one end of each arm adapted to engage the studs on the second-mentioned section so as to produce a clamping action along the approximate center line of the second-mentioned section and react along the center line of the first mentioned section and avoid thrusts between the sections normal to the plane of the projecting studs and means for limiting the angular movement of one section with respect to the other about an axis passing through the first-mentioned studs.

5. A pipe coupling comprising one pipe section having an enlarged end with a socket and studs projecting from opposite sides and a second section having a bulbous end adapted to snugly fit within the socket of the other section at various angles and having outwardly projecting studs, a link hinged to each stud on one section, the edges of the socket in one section having notches for receiving the studs on the other section, a hand lever having arms hinged to the links by which the section to which the links are hinged may be drawn to insert the bulbous end of one section into the socket of the other section, the ends of the arms of said lever interlocking with the studs of the other section with a toggle action when the bulbous end is seated in the socket and the hand lever is folded against the other section, the pipe section having the bulbous end also having an enlarged portion constituting a shoulder near the bulbous end to coact with the end of the other section and form a stop to limit the angular turning of one section on the other section.

HUGH FRANCIS FENLON.

REFERENCES CITED

The following references are of record in the file of this patent:

UNITED STATES PATENTS

| Number | Name | Date |
| --- | --- | --- |
| 143,514 | Kilburn | Oct. 7, 1873 |
| 543,871 | Houze | Aug. 6, 1895 |
| 1,793,015 | Roos | Feb. 17, 1931 |
| 1,949,055 | Lambie | Feb. 27, 1934 |